United States Patent [19]

El-Sayed et al.

[11] Patent Number: 5,130,221
[45] Date of Patent: Jul. 14, 1992

[54] SALTS OF ACID-CONTAINING AB DIBLOCK COPOLYMERS AS CHARGE DIRECTORS FOR POSITIVE-WORKING ELECTROSTATIC LIQUID DEVELOPERS

[75] Inventors: Lyla M. El-Sayed, West Chester, Pa.; Loretta A. G. Page, Newark, Del.

[73] Assignee: DXImaging, Lionville, Pa.

[21] Appl. No.: 489,649

[22] Filed: Mar. 7, 1990

[51] Int. Cl.⁵ .............................. G03G 9/12
[52] U.S. Cl. .................... 430/114; 430/115; 430/137
[58] Field of Search ............ 430/114, 115, 116, 137

[56] References Cited

U.S. PATENT DOCUMENTS 4,663,265  5/1987  Uytterhoeven et al. ........... 430/114
4,917,985  4/1990  El-Sayed et al. .................. 430/114

Primary Examiner—John Goodrow

[57] ABSTRACT

Positive-working electrostatic liquid developer consisting essentially of
(A) nonpolar liquid having Kauri-butanol value less than 30, present in major amount,
(B) thermoplastic resin particles having an average particle size by area of less than 10 μm, and
(C) an AB diblock copolymer charge director compound as defined. Optionally a colorant and charge adjuvant are present. The process of making the electrostatic liquid developer is described. The electrostatic liquid developer is useful in copying, making proofs including digital color proofs, lithographic printing plates, and resists.

49 Claims, No Drawings

SALTS OF ACID-CONTAINING AB DIBLOCK COPOLYMERS AS CHARGE DIRECTORS FOR POSITIVE-WORKING ELECTROSTATIC LIQUID DEVELOPERS

TECHNICAL FIELD

This invention relates to electrostatic liquid developers. More particularly this invention relates to positive-working electrostatic liquid developers containing salts of acid-containing AB diblock copolymers as charge directors.

BACKGROUND ART

It is known that a latent electrostatic image can be developed with toner particles dispersed in a carrier liquid, generally an insulating nonpolar liquid. Such dispersed materials are known as liquid toners or liquid developers. A latent electrostatic image may be produced by providing a photoconductive layer with a uniform electrostatic charge and subsequently discharging the electrostatic charge by exposing it to a modulated beam of radiant energy. Other methods are known for forming latent electrostatic images. For example, one method is providing a carrier with a dielectric surface and transferring a preformed electrostatic charge to the surface. Useful liquid developers comprise a thermoplastic resin and dispersant nonpolar liquid. Generally a suitable colorant is present such as a dye or pigment. The colored toner particles are dispersed in the nonpolar liquid which generally has a high-volume resistivity in excess of $10^9$ ohm centimeters, a low dielectric constant below 3.0, and a high vapor pressure. The toner particles are less than 10 $\mu$m average by area size determined, for example by a Horiba Particle Size Analyzer, Horiba Instruments, Inc., Irvine, Calif. After the latent electrostatic image has been formed, the image is developed by the colored toner particles dispersed in said nonpolar liquid and the image may subsequently be transferred to a carrier sheet.

Since the formation of proper images depends on the differences of the charge between the liquid developer and the latent electrostatic image to be developed, it has been found desirable to add a charge director compound and preferably adjuvants, e.g., polyhydroxy compounds, aminoalcohols, polybutylene succinimide, metallic soaps, an aromatic hydrocarbon, etc., to the liquid developer comprising the thermoplastic resin, dispersant nonpolar liquid and preferably a colorant. Such liquid developers provide images of good resolution, but it has been found that charging and image quality are particularly pigment dependent. Some formulations, suffer from poor image quality manifested by low resolution, poor solid area coverage, and/or image squash. Commercially available charge directors for toners often are by-products of the oil industry or decomposition residues of natural substances. These compounds are impure and the product composition is unreliable. In order to overcome such problems much research effort has been expended to develop new type charge directors and/or charging adjuvant for electrostatic liquid toners.

It has been found that the above disadvantages can be overcome and improved developers prepared containing a nonpolar liquid, a thermoplastic resin, a charge director compound of the invention, and preferably a colorant. The improved electrostatic liquid developer charged with the charge director compound of the invention when used to develop an electrostatic image results in image quality, squash, and solid area coverage comparable to other known charge directors with the additional advantage that for a given liquid developer the charge director structure can be strictly controlled to optimize liquid developer performance.

SUMMARY OF THE INVENTION

In accordance with this invention there is provided a positive-working electrostatic liquid developer consisting essentially of (A) a nonpolar liquid having a Kauri-butanol value of less than 30, present in a major amount, (B) thermoplastic resin particles having an average by area particle size of less than 10 $\mu$m, and (C) an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

In accordance with an embodiment of this invention there is provided a process for preparing a positive-working electrostatic liquid developer for electrostatic imaging comprising (A) dispersing at an elevated temperature in a vessel a thermoplastic resin, and a nonpolar liquid having a Kauri-butanol value of less than 30, while maintaining the temperature in the vessel at a temperature sufficient to plasticize and liquify the resin and below that at which the nonpolar liquid degrades and the resin decomposes, (B) cooling the dispersion, either
  (1) without stirring to form a gel or solid mass, followed by shredding the gel or solid mass and grinding by means of particulate media;
  (2) with stirring to form a viscous mixture and grinding by means of particulate media; or
  (3) while grinding by means of particulate media to prevent the formation of a gel or solid mass;

(C) separating the dispersion of toner particles having an average by area particle size of less than 10 $\mu$m from the particulate media, and (D) adding to the dispersion during or subsequent to Step (A) an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

Throughout the specification the below-listed terms have the following meanings:

In the claims appended hereto "consisting essentially of" means the composition of the electrostatic liquid developer does not exclude unspecified components which do not prevent the advantages of the developer from being realized. For example, in addition to the primary components, there can be present additional components, such as a colorant, fine particle size oxides, adjuvant, e.g., polyhydroxy compound, aminoalcohol, polybutylene succinimide, aromatic hydrocarbon, metallic soap, etc.

Aminoalcohol means that there is both an amino functionality and hydroxyl functionality in one compound.

Conductivity is the conductivity of the developer measured in picomhos (pmho)/cm at 5 hertz and 5 volts.

The nonpolar liquids (A) are, preferably, branched-chain aliphatic hydrocarbons and more particularly, Isopar®-G, Isopar®-H, Isopar®-K, Isopar®-L, Isopar®-M and Isopar®-V. These hydrocarbon liquids are narrow cuts of isoparaffinic hydrocarbon fractions with extremely high levels of purity. For example, the boiling range of Isopar®-G is between 157° C. and 176° C., Isopar®-H between 176° C. and 191° C., Isopar®-K between 177° C. and 197° C., Isopar®-L between 188° C. and 206° C. and Isopar®-M between 207° C. and 254° C. and Isopar®-V between 254.4° C. and 329.4° C. Isopar®-L has a mid-boiling point of approximately 194° C. Isopar®-M has a flash point of 80° C. and an auto-ignition temperature of 338° C. Stringent manufacturing specifications, such as sulphur, acids, carboxyl, and chlorides are limited to a few parts per million. They are substantially odorless, possessing only a very mild paraffinic odor. They have excellent odor stability and are all manufactured by the Exxon Corporation. High-purity normal paraffinic liquids, Norpar®12, Norpar®13 and Norpar®15, Exxon Corporation, may be used. These hydrocarbon liquids have the following flash points and auto-ignition temperatures:

| Liquid | Flash Point (°C.) | Auto-Ignition Temp (°C.) |
| --- | --- | --- |
| Norpar ®12 | 9 | 204 |
| Norpar ®13 | 93 | 210 |
| Norpar ®15 | 118 | 210 |

All of the nonpolar liquids have an electrical volume resistivity in excess of $10^9$ ohm centimeters and a dielectric constant below 3.0. The vapor pressures at 25° C. are less than 10 Torr. Isopar®-G has a flash point, determined by the tag closed cup method, of 40° C., OC Isopar®-H has a flash point of 53° C. determined by ASTM D 56 Isopar®-L and Isopar®-M have flash points of 61° C., and 80° C., respectively, determined by the same method. While these are the preferred dispersant nonpolar liquids, the essential characteristics of all suitable dispersant nonpolar liquids are the electrical volume resistivity and the dielectric constant. In addition, a feature of the dispersant nonpolar liquids is a low Kauri-butanol value less than 30, preferably in the vicinity of 27 or 28, determined by ASTM D 1133. The ratio of thermoplastic resin to dispersant nonpolar liquid is such that the combination of ingredients becomes fluid at the working temperature. The nonpolar liquid is present in an amount of 85 to 99.9% by weight, preferably 97 to 99.5% by weight, based on the total weight of liquid developer. The total weight of solids in the liquid developer is 0.1 to 15%, preferably 0.5 to 3.0% by weight. The total weight of solids in the liquid developer is solely based on the resin, including components dispersed therein, and any pigment component present.

Useful thermoplastic resins or polymers include: ethylene vinyl acetate (EVA) copolymers (Elvax® resins, E. I. du Pont de Nemours and Company, Wilmington, Del.), copolymers of ethylene and an α,β-ethylenically unsaturated acid selected from the group consisting of acrylic acid and methacrylic acid, copolymers of ethylene (80 to 99.9%)/acrylic or methacrylic acid (20 to 0%)/alkyl ($C_1$ to $C_5$) ester of methacrylic or acrylic acid (0 to 20%), polyethylene, polystyrene, isotactic polypropylene (crystalline), ethylene ethyl acrylate series sold under the trademark Bakelite® DPD 6169, DPDA 6182 Natural and DTDA 9169 Natural by Union Carbide Corp., Stamford, Conn.; ethylene vinyl acetate resins, e.g., DQDA 6479 Natural and DQDA 6832 Natural 7 also sold by Union Carbide Corp.; Surlyn® ionomer resin by E. I. du Pont de Nemours and Company, Wilmington, Del., etc., or blends thereof, polyesters, polyvinyl toluene, polyamides, styrene/butadiene copolymers and epoxy resins. The synthesis of copolymers of ethylene and an α,β-ethylenically unsaturated acid of either acrylic acid or methacrylic is described in Rees U.S. Pat. No. 3,264,272, the disclosure of which is incorporated herein by reference. For the purposes of preparing these copolymers, the reaction of the acid containing copolymer with the ionizable metal compound, as described in the Rees patent, is omitted. The ethylene constituent is present in about 80 to 99.9% by weight of the copolymer and the acid component in about 20 to 0.1% by weight of the copolymer. The acid numbers of the copolymers range from 1 to 120, preferably 54 to 90. Acid No. is milligrams potassium hydroxide required to neutralize 1 gram of polymer. The melt index (g/10 min) of 10 to 500 is determined by ASTM D 1238 Procedure A. Particularly preferred copolymers of this type have an acid number of 54 and a melt index of 100 and 500 determined at 190° C., respectively. A copolymer of ethylene (89% by weight/methacrylic acid (11% by weight) having a melt index at 190° C. of 100 is illustrative.

Preferred thermoplastic resins include acrylic resins, such as a copolymer of acrylic or methacrylic acid (optional but preferred) and at least one alkyl ester of acrylic or methacrylic acid wherein alkyl is 1 to 20 carbon atoms, e.g., methyl methacrylate(50 to 90%)/methacrylic acid(0 to 20%)/ethylhexyl acrylate(10 to 50%); and other acrylic resins including Elvacite® Acrylic Resins, E. I. du Pont de Nemours and Company, Wilmington, Del., or blends of the resins, polystyrene, polyethylene, and modified resins disclosed in El-Sayed et al., U.S. Pat. No. 4,798,778, the disclosure of which is incorporated herein by reference.

In addition, the resins have the following preferred characteristics:

1. Be able to disperse the colorant, e.g., pigment, metallic soap adjuvant, etc.

2. Be substantially insoluble in the dispersant liquid at temperatures below 40° C., so that the resin will not dissolve or solvate in storage, 3. Be able to solvate at temperatures above 50° C., 4. Be able to be ground to form particles between 0.1 μm and 5 μm, in diameter (preferred size), e.g., determined by Horiba CAPA-500 centrifugal particle analyzer; and between 1 μm and 15 μm in diameter, e.g., determined by Malvern 3600E, which uses laser diffraction light scattering of stirred samples to determine average particle sizes.

5. Be able to form a particle (average by area) of less than 10 μm, e.g., determined by Horiba CAPA-500 centrifugal automatic particle analyzer, manufactured by Horiba Instruments, Inc., Irvine, Calif.: solvent viscosity of 1.24 cps, solvent density of 0.76 g/cc, sample density of 1.32 using a centrifugal rotation of 1,000 rpm, a particle size range of 0.01 to less than 10 μm, and a particle size cut of 1.0 μm, and about 30 μm average particle size, e.g., determined by Malvern 3600E Particle Sizer as described below, and 6. Be able to fuse at temperatures in excess of 70° C. By solvation in 3. above, the resins forming the toner particles will become swollen or gelatinous.

The carrier liquid, e.g., nonpolar liquid, soluble AB diblock copolymer charge directors of the invention (Component (C)) which can be used as positive charge directors comprise a B block which is polymer that is substantially soluble in the nonpolar liquid and has a number average molecular weight (determined by known osmometry techniques) in the range of about 2,000 to 50,000 and an A block which is the salt of a carboxylic acid-containing polymer having a number average molecular weight range of 200 to 10,000, the weight percent of the A block being 5 to 40% of the polymer, and preferably 10–25%.

The AB polymers can be advantageously produced by stepwise polymerization process such as anionic or group transfer polymerization as described in Webster, U.S. Pat. No. 4,508,880, the disclosure of which is incorporated herein by reference. Polymers so produced have very precisely controlled molecular weights, block sizes and very narrow molecular weight distributions, e.g., weight average molecular weight divided by number average molecular weight. Weight average molecular weight can be determined by gel permeation chromatography (GPC). The AB diblock copolymer charge directors can also be formed by free radical polymerization wherein the initiation unit is comprised of two different moieties which initiate polymerization at two distinctly different temperatures. However, this method suffers from contamination of the block copolymers with homopolymer and coupled products.

The AB diblock copolymers can also be prepared by conventional anionic polymerization techniques, in which a first block of the copolymer is formed, and, upon completion of the first block, a second monomer stream is started to form a subsequent block of the polymer. The reaction temperatures using such techniques should be maintained at a low level, for example, 0° to −40° C., so that side reactions are minimized and the desired blocks, of the specified molecular weights, are obtained.

More specifically the A block is an alkyl, aryl or alkylaryl carboxylic acid salt-containing polymer wherein the alkyl, e.g., 1 to 200 carbon atoms, aryl, e.g., 6 to 30 carbon atoms, or alkylaryl, e.g., 7 to 200 carbon atoms, moiety can be substituted or unsubstituted. Examples of substituents include: Cl, F, Br, I, $NO_2$, $OCH_3$, OH, etc. The salt of the carboxylic acid may be formed by reaction with the carboxylic acid moiety before or after polymerization. Useful A blocks are polymers prepared from at least one monomer selected from the group consisting of (1) $CH_2=CCH_3CO_2X$, (2) $CH_2=CHCO_2X$, (3) $CH_2=COR-CO_2X$, and (4) $CH_2=CHR^1-CO_2X$ wherein R is alkyl of 1 to 200 carbon atoms, aryl of 6 to 30 carbon atoms, alkylaryl of 7 to 200 carbon atoms, $R^1$ is an aromatic ring wherein the ring carbon atoms not substituted by the vinyl group may be substituted with R, and X is a cation, e.g., $Ca^{2+}$, $Ba^{2+}$, $Zr^{2+}$, $Fe^{3+}$, $Mn^{2+}$, $NR_4^+$ wherein R is as described above, etc. Preferred for X are benzyltrimethyl ammonium and other cations which contain alkyl, aryl or alkylaryl groups as set out above. Examples of monomers useful in preparing A blocks include: salts of acrylic acid, methacrylic acid, 2-, 3-, or 4-vinyl benzoic acid, etc. The salts of these acids may be formed before or after polymerization. Useful B blocks are polymers prepared from at least one monomer selected from the group consisting of butadiene, isoprene and compounds of the general formulas $CH_2=CCH_3CO_2R^2$ and $CH_2=CHCO_2R^2$ wherein $R^2$ is alkyl of 8-30 carbon atoms. Examples of monomers useful in preparing B blocks include: 2-ethylhexyl methacrylate, lauryl methacrylate, stearyl methacrylate, butadiene, isoprene, ethylhexyl acrylate, lauryl acrylate, etc. Useful AB diblock copolymer charge directors include: the block copolymer of poly-(N,N-trimethyl-N-benzyl ammonium) methacrylate and polyethylhexyl methacrylate, polycalcium methacrylate and polyethylhexyl methacrylate, poly-iron acrylate and polybutadiene, poly-barium-2-vinylbenzoic acid and polyisoprene, poly-manganese-4-vinylbenzoic acid and polylauryl methacrylate, polymethyltriethylammonium methacrylate and polystearylmethacrylate, etc. The charge director is present in 0.1 to 10,000 milligrams per gram of developer solids, preferably 1 to 1000 milligrams per gram of developer solids.

The optimum AB diblock copolymer charge director structure is dependent on the electrostatic liquid developer. To optimize the charge director structure the size of the A and B polymer blocks, as well as the ratio between A and B can be changed. The solubility of the counterion in the carrier liquid, e.g., nonpolar liquid, also affects performance.

As indicated above, additional components that can be present in the electrostatic liquid developer are colorants, such as pigments or dyes and combinations thereof, which are preferably present to render the latent image visible, though this need not be done in some applications. The colorant, e.g., a pigment, may be present in the amount of up to about 60 percent by weight based on the total weight of developer solids, preferably 0.01 to 30% by weight based on the total weight of developer solids. The amount of colorant may vary depending on the use of the developer. Examples of pigments include:

| Pigment List | | |
|---|---|---|
| Pigment Brand Name | Manufacturer | Colour Index Pigment |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Lumogen ® Light Yellow | BASF | Yellow 110 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | Yellow 14 |
| L75-1331 Yellow | Sun Chem. | Yellow 17 |
| L75-2337 Yellow | Sun Chem. | Yellow 83 |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |

Pigment List -continued

| Pigment Brand Name | Manufacturer | Colour Index Pigment |
| --- | --- | --- |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | Blue:3 |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | |
| Indofast ® Violet | Mobay | Violet 23 |
| Monastral ® Violet Maroon B | Ciba-Geigy | Violet 42 |
| Sterling ® NS Black | Cabot | Black 7 |
| Sterling ® NSX 76 | Cabot | |
| Tipure ® R-101 | Du Pont | White 6 |
| Mogul L | Cabot | Black, CI 77266 |
| Uhlich ® BK 8200 | Paul Uhlich | Black (Blackness Index 155) |

Other ingredients may be added to the electrostatic liquid developer, such as fine particle size oxides, e.g., silica, alumina, titania, etc.; preferably in the order of 0.5 $\mu$m or less can be dispersed into the liquefied resin. These oxides can be used alone or in combination with the colorant. Metal particles can also be added.

Another additional component of the electrostatic liquid developer is an adjuvant which can be selected from the group consisting of polyhydroxy compound which contains at least 2 hydroxy groups, aminoalcohol, polybutylene succinimide, metallic soap and aromatic hydrocarbon having a Kauri-butanol value of greater than 30. The adjuvants are generally used in an amount of 1 to 1000 mg/g, preferably 1 to 200 mg/g developer solids. Examples of the various above-described adjuvants include:

polyhydroxy compounds: ethylene glycol, 2,4,7,9-tetramethyl-5-decyn-4,7-diol, poly(propylene glycol), pentaethylene glycol, tripropylene glycol, triethylene glycol, glycerol, pentaerythritol, glycerol-tri-12 hydroxystearate, ethylene glycol monohydroxystearate, propylene glycerol monohydroxy-stearate, etc., as described in Mitchell U.S. Pat. No. 4,734,352.

aminoalcohol compounds: triisopropanolamine, triethanolamine, ethanolamine, 3-amino-1-propanol, o-aminophenol, 5-amino-1-pentanol, tetra(2-hydroxyethyl)ethylenediamine, etc., as described in Larson U.S. Pat. No. 4,702,985.

polybutylene/succinimide: OLOA ®-1200 sold by Chevron Corp., analysis information appears in Kosel U.S. Pat. No. 3,900,412, column 20, lines 5 to 13, incorporated herein by reference; Amoco 575 having a number average molecular weight of about 600 (vapor pressure osmometry) made by reacting maleic anhydride with polybutene to give an alkenylsuccinic anhydride which in turn is reacted with a polyamine. Amoco 575 is 40 to 45% surfactant, 36% aromatic hydrocarbon, and the remainder oil, etc. These adjuvants are described in El-Sayed and Taggi U.S. Pat. No. 4,702,984.

metallic soaps: aluminum tristearate; aluminum distearate; barium, calcium, lead, and zinc stearates; cobalt, manganese, lead, and zinc linoleates; aluminum, calcium, and cobalt octoates; calcium and cobalt oleates; zinc palmitate; calcium, cobalt, manganese, lead, and zinc naphthenates; calcium, cobalt, manganese, lead, and zinc resinates; etc. The metallic soap is dispersed in the thermoplastic resin as described in Trout, U.S. Pat. Nos. 4,707,429 and 4,740,444.

aromatic hydrocarbon: benzene, toluene, naphthalene, substituted benzene and naphthalene compounds, e.g., trimethylbenzene, xylene, dimethylethylbenzene, ethylmethylbenzene, propylbenzene, Aromatic 100 which is a mixture of $C_9$ and $C_{10}$ alkylsubstituted benzenes manufactured by Exxon Corp., etc., as described in Mitchell U.S. Pat. No. 4,631,244.

The disclosures of the above-listed United States patents describing the adjuvants are incorporated herein by reference.

The particles in the electrostatic liquid developer have an average by area particle size of less than 10 $\mu$m, preferably the average by area particle size is less than 5 $\mu$m as measured by the Horiba instrument described above. The resin particles of the developer may or may not be formed having a plurality of fibers integrally extending therefrom although the formation of fibers extending from the toner particles is preferred. The term "fibers" as used herein means pigmented toner particles formed with fibers, tendrils, tentacles, threadlets, fibrils, ligaments, hairs, bristles, or the like.

The electrostatic liquid developer can be prepared by a variety of processes. For example, into a suitable mixing or blending vessel, e.g., attritor, heated ball mill, heated vibratory mill such as a Sweco Mill manufactured by Sweco Co., Los Angeles, Calif., equipped with particulate media, for dispersing and grinding, Ross double planetary mixer manufactured by Charles Ross and Son, Hauppauge, N.Y., etc., or a two roll heated mill (no particulate media necessary) are placed at least one of thermoplastic resin, and nonpolar liquid described above. Generally the resin, nonpolar liquid and optional colorant are placed in the vessel prior to starting the dispersing step. Optionally the colorant can be added after homogenizing the resin and the nonpolar liquid. Polar liquid such as disclosed in Mitchell U.S. Pat. No. 4,631,244, col. 5, lines 57-64 and the examples, can also be present in the vessel, e.g., up to 100% based on the weight of total developer liquid. The disclosure of Mitchell is incorporated herein by reference. The dispersing step is generally accomplished at elevated temperature, i.e., the temperature of ingredients in the vessel being sufficient to plasticize and liquefy the resin but being below that at which the nonpolar liquid or polar liquid, if present, degrades and the resin and/or colorant, if present, decomposes. A preferred temperature range is 80° to 120° C. Other temperatures outside this range may be suitable, however, depending on the particular ingredients used. The presence of the irregularly moving particulate media in the vessel is preferred to prepare the dispersion of toner particles. Other stirring means can be used as well, however, to prepare dispersed toner particles of proper size, configuration and morphology. Useful particulate media are particulate materials, e.g., spherical, cylindrical, etc. selected from the group consisting of stainless steel, carbon steel, alumina, ceramic, zirconia, silica, and sillimanite. Carbon steel particulate media is particularly useful when colorants other than black are used. A typical diameter range for the particulate media is in the range of 0.04 to 0.5 inch (1.0 to approx. 13 mm).

After dispersing the ingredients in the vessel, with or without a polar liquid present until the desired dispersion is achieved, typically 1 hour with the mixture being fluid, the dispersion is cooled, e.g., in the range of 0° C. to 50° C. Cooling may be accomplished, for example, in the same vessel, such as the attritor, while simultaneously grinding with particulate media to prevent the formation of a gel or solid mass with or without the presence of additional liquid; without stirring to form a gel or solid mass, followed by shredding the gel or solid mass and grinding, e.g., by means of particulate media with or without the presence of additional liquid; or with stirring to form a viscous mixture and grinding by means of particulate media with or without the presence of additional liquid. Additional liquid may be added at any step during the preparation of the liquid electrostatic toners to facilitate grinding or to dilute the toner to the appropriate % solids needed for toning. Additional liquid means nonpolar liquid, polar liquid or combinations thereof. Cooling is accomplished by means known to those skilled in the art and is not limited to cooling by circulating cold water or a cooling material through an external cooling jacket adjacent the dispersing apparatus or permitting the dispersion to cool to ambient temperature. The resin precipitates out of the dispersant during the cooling. Toner particles of average particle size (by area) of less than 10 $\mu$m, as determined by a Horiba CAPA-500 centrifugal particle analyzer described above or other comparable apparatus, are formed by grinding for a relatively short period of time.

Another instrument for measuring average particles sizes is a Malvern 3600E Particle Sizer manufactured by Malvern, Southborough, Mass. which uses laser diffraction light scattering of stirred samples to determine average particle sizes. Since these two instrument use different techniques to measure average particle size the readings differ. The following correlation of the average size of toner particles in micrometers ($\mu$m) for the two instruments is:

| Value Determined By Malvern 3600E Particle Sizer | Expected Range For Horiba CAPA-500 |
| --- | --- |
| 30 | 9.9 ± 3.4 |
| 20 | 6.4 ± 1.9 |
| 15 | 4.6 ± 1.3 |
| 10 | 2.8 ± 0.8 |
| 5 | 1.0 ± 0.5 |
| 3 | 0.2 ± 0.6 |

This correlation is obtained by statistical analysis of average particle sizes for 67 liquid electrostatic developer samples (not of this invention) obtained on both instruments. The expected range of Horiba values was determined using a linear regression at a confidence level of 95%. In the claims appended to this specification the particle size values are as measured using the Horiba instrument.

After cooling and separating the dispersion of toner particles from the particulate media, if present, by means known to those skilled in the art, it is possible to reduce the concentration of the toner particles in the dispersion, impart an electrostatic charge of predetermined polarity to the toner particles, or a combination of these variations. The concentration of the toner particles in the dispersion is reduced by the addition of additional nonpolar liquid as described previously above. The dilution is normally conducted to reduce the concentration of toner particles to between 0.1 to 15 percent by weight, preferably 0.3 to 3.0, and more preferably 0.5 to 2 weight percent with respect to the dispersant nonpolar liquid. One or more AB diblock copolymer charge director compounds (C), of the type set out above, can be added to impart a positive charge to the liquid electrostatic developer. The addition may occur at any time during the process; preferably at the end of the process, e.g., after the particulate media, if used, are removed and the concentration of toner particles is accomplished. If a diluting nonpolar liquid is also added, the AB diblock copolymer charge director compound can be added prior to, concurrently with, or subsequent thereto. If an adjuvant compound of a type described above has not been previously added in the preparation of the developer, it can be added prior to or subsequent to the developer being charged.

Other process embodiments for preparing the positive-working electrostatic liquid developer include:

(A) dispersing a thermoplastic resin and optionally a colorant and/or adjuvant in the absence of a nonpolar liquid having a Kauri-butanol value of less than 30 to form a solid mass.

(B) shredding the solid mass, (C) grinding the shredded solid mass by means of particulate media in the presence of a liquid selected from the group consisting of a polar liquid having a Kauri-butanol value of at least 30, a nonpolar liquid having a Kauri-butanol value of less than 30, and combinations thereof, (D) separating the dispersion of toner particles having an average by area particle size of less than 10 $\mu$m from the particulate media, and (E) adding additional nonpolar liquid, polar liquid or combinations thereof to reduce the concentration of toner particles to between 0.1 to 15 percent by weight with respect to the liquid; and (F) adding to the dispersion an AB diblock copolymer charge director compound of the invention; and (A) dispersing a thermoplastic resin and optionally a colorant and/or adjuvant in the absence of a nonpolar liquid having a Kauri-butanol value of less than 30 to form a solid mass.

(B) shredding the solid mass, (C) redispersing the shredded solid mass at an elevated temperature in a vessel in the presence of a nonpolar liquid having a Kauri-butanol value of less than 30, while maintaining the temperature in the vessel at a temperature sufficient to plasticize and liquify the resin and below that at which the nonpolar liquid degrades and the resin and/or colorant decomposes, (D) cooling the dispersion, either
   (1) without stirring to form a gel or solid mass, followed by shredding the gel or solid mass and grinding by means of particulate media with or without the presence of additional liquid;
   (2) with stirring to form a viscous mixture and grinding by means of particulate media with or without the presence of additional liquid; or
   (3) while grinding by means of particulate media to prevent the formation of a gel or solid mass with or without the presence of additional liquid;

(E) separating the dispersion of toner particles having an average by area particle size of less than 10 $\mu$m from the particulate media, and (F) adding additional nonpolar liquid, polar liquid or combinations thereof to reduce the concentration of toner particles to between 0.1 to 15 percent by weight with respect to the liquid; and (G) adding to the dispersion an AB diblock copolymer charge director compound of the invention.

INDUSTRIAL APPLICABILITY

The AB diblock copolymer charge directors of this invention are capable of charging electrostatic liquid developers positively. The synthetic AB diblock copolymers are advantageous because their molecular weight, the amount of acid salt present, and the ratio of the acid salt block to the carrier liquid soluble block can be reproducibly controlled, which allows for superior batch to batch reproducibility of charge directors whose structures are selected for optimum developer performance. The AB diblock copolymers are prepared with high purity and very low toxicity. The electrostatic liquid developers demonstrate good image quality, resolution, solid area coverage, and toning of fine details, evenness of toning, reduced squash independent of the pigment present. The developers of this invention are useful in copying, e.g., making office copies of black and white as well as various colors; or color proofing, e.g., a reproduction of an image using the standard colors: yellow, cyan, magenta together with black as desired. In copying and proofing the liquid developer is applied to a latent electrostatic image. Other uses envisioned for the electrostatic liquid developers include: digital color proofing, lithographic printing plates, and resists.

EXAMPLES

The following controls and examples wherein the parts and percentages are by weight illustrate but do not limit the invention. In the examples the melt indices were determined by ASTM D 1238, Procedure A, the average particle sizes by area were determined by a Horiba CAPA-500 centrifugal particle analyzer or a Malvern Particle sizer as described above, the conductivity was measured in picomhos/cm (pmhos) at 5 hertz and low voltage, 5 volts, and the density was measured using a McBeth densitometer model RD918. The resolution is expressed in the examples in line pairs/mm (lp/mm). Weight average molecular weight can be determined by gel permeation chromatography (GPC). Number average molecular weight can be determined by known osmometry techniques.

The AB diblock copolymers of the invention to be used in the Examples are prepared as follows:

PREPARATION 1

A reaction vessel was charged with 432 g toluene, 5.05 g mesitylene, 8.76 g (0.05 mol) 1-ethoxy-1-trimethylsiloxy-2-methylpropene ("initiator"), and 1.5 ml of 0.33 M tetrabutylammonium-3-chlorobenzoate in acetonitrile/THF ("catalyst"). Two feeds were begun simultaneously; 305.34 g (1.54 mol) 2-ethylhexyl methacrylate (EHMA) were added over 30 minutes, and 1.5 ml catalyst in 4 g toluene were added over 90 minutes. Reaction of EHMA was followed by high pressure liquid chromatography. After all the EHMA had reacted (twenty minutes after the addition of EHMA), 63.3 g (0.40 mol) of (trimethylsilyl) methacrylic acid (TMS-MAA) were added over 30 minutes. Sixteen hours after the addition of TMS-MAA, all the TMS-MAA monomer had reacted, and 45.4 g methanol, 26.3 g water and 1.4 g dichloroacetic acid were added to quench and remove the trimethylsilyl groups. After refluxing three hours, the methanol and toluene/water azeotrope were distilled off, and Isopar ®-L was added. The excess methanol was stripped off by distillation. The remaining solution was 50% solids; titration indicated 0.40 mmol acid/g solution.

To form the calcium salts of the acid groups, 148.8 g of the above solution (60 mmol acid) was heated with 1.9 g calcium hydride (45 mmol) and an additional 150 g of toluene. The reaction was followed by Fourier Transform Infra-red Spectroscopy (FTIR). FTIR indicated the reaction was complete after refluxing for 37 hours. The excess calcium hydride was removed by filtration and discarded. The product formed was the diblock polycalcium methacrylate-co-polyethylhexyl methacrylate.

PREPARATION 2

The EHMA//MAA polymer was made as described in Preparation 1 with the following exception: instead of a calcium salt, the benzyltrimethylammonium salt of the acid was prepared by reacting 90 g of the polymer (36 mmol acid) with 15.5 grams of a 40% solution in methanol (24 mmol) of benzyltrimethylammonium hydroxide and an additional 150 grams of toluene. The reaction was refluxed for 2 hours and the methanol/toluene and toluene/water azeotropes were distilled off at 64° C. and 85° C. respectively. FTIR indicated the salt had been formed after distillation was complete. The polymer formed was the diblock copolymer polybenzyltrimethyl ammonium methacrylate-co-polyethylhexyl methacrylate.

PREPARATION 3

A reaction vessel was charged with 405 g Isopar ®-L, 32.8 g toluene, 5.05 g mesitylene, 10.4 g (0.06 mol) 1-ethoxy-1-trimethylsiloxy-2-methylpropene ("initiator"), and 1.5 ml of 0.33M tetrabutylammonium-3-chlorobenzoate in acetonitrile/tetrahydrofuran (THF) ("catalyst"). Two feeds were begun simultaneously; a mixture of 403.8 g (2.03 mol) 2-ethylhexyl methacrylate (EHMA) and 68.6 g (0.43 mol) of (trimethysilyl) methacrylic acid (TMS-MAA) were added over 30 minutes, and 1.5 ml catalyst in 4 g toluene were added over 90 minutes. Reaction of EHMA and TMS-MAA were followed by high pressure liquid chromatography. The monomers were allowed to react to completion overnight. Then 45.4 g methanol, 26.3 g water and 1.4 g dichloroacetic acid were added to quench and remove the trimethylsilyl groups. After refluxing three hours, the methanol and toluene/water azeotrope were distilled off, and enough Isopar ®-L was added to make the final solution 50% solids. Titration indicated 0.94 mmol acid/g solution. The prepared polymer was a random copolymer. To form the calcium salts of the acid groups, 100.1 g of the above solution (94.4 mmol acid) was heated with 3.16 g calcium hydride (75 mmol) and an additional 150 g of toluene. The reaction was followed by Fourier Transform Infrared Spectroscopy (FTIR). FTIR indicated the reaction was complete after refluxing for 18 hours. The excess calcium hydride was removed by filtration and discarded. The polymer formed was the random copolymer poly-calcium methacrylate-co-polyethylhexyl methacrylate.

PREPARATION 4

An EHMA/MAA random copolymer was made as described in Preparation 3. Instead of a calcium salt, the benzyltrimethyl ammonium salt of the acid was prepared by reacting 38 g of the polymer (36 mmol acid) with 15.5 g of a 40% solution in methanol (34 mmol) of benzyltrimethylammonium hydroxide and an additional 150 g toluene. The reaction was refluxed for 1 hour, and then the methanol/toluene and toluene/water azeotropes were distilled off at 64° C. and 85° C., respectively. FTIR indicated the salt had been formed after distillation was complete. The polymer formed was the random copolymer of polybenzyltrimethyl ammonium methacrylate-co-polyethylhexyl methacrylate.

CONTROL 1

In a Union Process 01 Attritor, Union Process Company, Akron, Ohio, were placed the following ingredients:

| INGREDIENT | AMOUNT (g) |
| --- | --- |
| Terpolymer of methyl acrylate (67.3%), methacrylic acid (3.1%), and ethylhexyl acrylate (29.6%) (weight average molecular weight 172,000, acid no. 13 | 35 |
| Uhlich ® 8200 pigment, Paul Uhlich & Co., Hastings-on-Hudson, NY | 9 |
| Lubrizol ® 2155, Lubrizol Corporation, Wickliff, OH | 5 |
| Isopar ®-L, non-polar liquid having Kauri-butanol value of 27 (Exxon Corp.) | 200 |

The ingredients were heated to 100 +/−10° C. in the attritor and milled with 0.1875 inch (4.76 mm) diameter stainless steel balls for one hour. The attritor was cooled to room temperature and milling was continued for 41 hours to obtain toner particles with an average particles size by area of 0.83 $\mu$m (Horiba). The particulate media were removed and the dispersion of toner particles was then diluted to 1 percent solids with additional Isopar ®-L. To 1.5 kg of this dispersion, 112.5 of a 20% solution in Isopar ®-L of the charge director described in Preparation 3 was added. Conductivity of the developer solution was 30 pmhos. No image was obtained.

CONTROL 2

Developer samples were prepared by the procedure described in Control 1 with the following exception: instead of the charge director made in Preparation 3, 135.8 g of a 10% solution in Isopar ®-L of the charge director described in Preparation 4 was used. Conductivity was 30 pmhos. No image was obtained.

CONTROL 3

The procedure of Control 1 was repeated with the following exceptions: instead of the acrylic terpolymer, a copolymer of 82% ethylene and 18% vinyl acetate was used. Instead of the 9.0 g of Uhlich ® 8200 pigment, 9 g of Heucophthal Blue ® XBT-58D (Heubach Inc., Newark, N.J.) was used. The dispersion was cold ground for 19 hours instead of 41 hours to obtain a toner with an average particle size by area of 0.77 $\mu$m (Horiba). The particulate media were removed and the dispersion of toner particles was then diluted to 1 percent solids with additional Isopar ®-L. Instead of 112.5 g, 159.9 g of the charge director solution was added. Conductivity was 30 pmhos. Only very small regions of very faint images of negligible density were obtained from this developer.

CONTROL 4

Developer samples were prepared by the procedure described in Control 3 with the following exception: instead of the charge director described in Preparation 3, 335.8 g of a 10% solution of the charge director described in Preparation 4 was used. Very faint images were obtained, with density equal to 0.79, resolution of 6.3 lp/mm, and some squash.

EXAMPLE 1

Developer samples were prepared by the procedure described in Control 1 with the following exception: instead of using a calcium salt of the random EHMA/MAA polymer described in Preparation 3 as the charge director, the calcium salt of the EHMA/MAA diblock polymer described in Preparation 1 was used. Conductivity of the toner was raised to 27 pmhos by adding 46 g of a 2.5% solution in Isopar ®-L of the Preparation 1 charge director to make the developer. Images from this developer had good solids coverage, density of 1.53, a resolution of 6.3 lp/mm, and considerable squash.

EXAMPLE 2

Developer samples were prepared by the procedure described in Control 1 with the following exception: instead of using the benzyltrimethyl ammonium salt of the random EHMA/MAA copolymer described in Preparation 4 as the charge director, 28.4 g of a 10% solution of the benzyltrimethyl ammonium salt of the EHMA//MAA diblock copolymer described in Preparation 2 was used. Conductivity was determined as 30. Density was 0.5, with resolution of 5.6 lp/mm and some squash.

EXAMPLE 3

Developer samples were prepared by the procedure described in Control 4 with the following exception: instead of the charge director described in Preparation 4, 33.7 g of a 10% solution of the charge director described in Preparation 2 was used. Conductivity was determined as 30. Density was 1.73, resolution was 10 lp/mm, and there was no squash.

We claim:

1. A positive-working electrostatic liquid developer consisting essentially of
   (A) a nonpolar liquid having a Kauri-butanol value of less than 30, present in a major amount,
   (B) thermoplastic resin particles having an average by area particle size of less than 10 $\mu$m, and
   (C) an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

2. An electrostatic liquid developer according to claim 1 wherein the A block of the AB diblock copolymer is a polymer prepared from at least one monomer selected from the group consisting of (1) $CH_2=CCH_3CO_2X$, (2) $CH_2=CHCO_2X$, (3) $CH_2=COR-CO_2X$, and (4) $CH_2=CHR^1-CO_2X$ wherein R is alkyl of 1 to 200 carbon atoms, aryl of 6 to 30 carbon atoms, alkylaryl of 7 to 200 carbon atoms, $R^1$ is an aromatic ring wherein the ring carbon atoms not substituted by the vinyl group may be substituted with R, and X is a $Ca^{2+}$, $Ba^{2+}$, $Zr^{2+}$, $Fe^{3+}$, $Mn^{2+}$, $NR^{4+}$, wherein R is alkyl of 1 to 200 carbon atoms, aryl of 6 to 30 carbon atoms, alkylaryl of 7 to 200 carbon atoms.

3. An electrostatic liquid developer according to claim 1 wherein the A block of the AB diblock copolymer is a polymer prepared from at least one monomer selected from the group consisting of salts of acrylic acid, methacrylic acid, 2-vinyl benzoic acid, 3-vinyl benzoic acid, and 4-vinyl benzoic acid.

4. An electrostatic liquid developer according to claim 1 wherein the B block of the AB diblock copolymer is a polymer prepared from at least one monomer selected from the group consisting of butadiene, isoprene and compounds of the general formulas: $CH_2=CCH_3CO_2R^2$ and $CH_2=CHCO_2R^2$ wherein $R^2$ is alkyl of 8 to 30 carbon atoms.

5. An electrostatic liquid developer according to claim 1 wherein the AB diblock copolymer is selected from the group consisting of poly-(N,N-trimethyl-benzyl ammonium) methacrylate and polyethylhexyl methacrylate; poly-calcium methacrylate and polyethylhexyl methacrylate, poly-iron acrylate and polybutadiene, poly-barium-2-vinylbenzoic acid and polyisoprene, polymanganese-4-vinylbenzoic acid and polylauryl methacrylate, and polymethyltriethylammonium methacrylate and polystearylmethacrylate.

6. An electrostatic liquid developer according to claim 1 wherein component (A) is present in 85 to 99.9% by weight, based on the total weight of the liquid developer, the total weight of solids is 0.1 to 15% by weight, and component (C) is present in 0.1 to 10,000 milligrams per gram of developer solids.

7. An electrostatic liquid developer according to claim 1 containing up to about 60% by weight of a colorant based on the total weight of developer solids.

8. An electrostatic liquid developer according to claim 7 wherein the colorant is a pigment.

9. An electrostatic liquid developer according to claim 7 wherein the colorant is a dye.

10. An electrostatic liquid developer according to claim 1 wherein a fine particle size oxide is present.

11. An electrostatic liquid developer according to claim 1 wherein an additional compound is present which is an adjuvant selected from the group consisting of polyhydroxy compound, aminoalcohol, polybutylene succinimide, metallic soap, and an aromatic hydrocarbon.

12. An electrostatic liquid developer according to claim 7 wherein an additional compound is present which is an adjuvant selected from the group consisting of polyhydroxy compound, aminoalcohol, polybutylene succinimide, metallic soap, and an aromatic hydrocarbon.

13. An electrostatic liquid developer according to claim 11 wherein a polyhydroxy adjuvant compound is present.

14. An electrostatic liquid developer according to claim 11 wherein an aminoalcohol adjuvant compound is present.

15. An electrostatic liquid developer according to claim 11 wherein a polybutylene succinimide adjuvant compound is present.

16. An electrostatic liquid developer according to claim 11 wherein a metallic soap adjuvant compound is present dispersed in the thermoplastic resin.

17. An electrostatic liquid developer according to claim 11 wherein an aromatic hydrocarbon adjuvant compound having a Kauri-butanol value of greater than 30 is present.

18. An electrostatic liquid developer according to claim 14 wherein the aminoalcohol adjuvant compound is triisopropanolamine.

19. An electrostatic liquid developer according to claim 1 wherein the thermoplastic resin is a copolymer of ethylene and an $\alpha,\beta$-ethylenically unsaturated acid selected from the group consisting of acrylic acid and methacrylic acid.

20. An electrostatic liquid developer according to claim 1 wherein the thermoplastic resin is a copolymer of ethylene (80 to 99.9%)/acrylic or methacrylic acid (20 to 0%)/alkyl ester of acrylic or methacrylic acid wherein alkyl is 1 to 5 carbon atoms (0 to 20%).

21. An electrostatic liquid developer according to claim 7 wherein the thermoplastic resin is a copolymer of ethylene (80 to 99.9%)/acrylic or methacrylic acid (20 to 0%)/alkyl ester of acrylic or methacrylic acid wherein alkyl is 1 to 5 carbon atoms (0 to 20%).

22. An electrostatic liquid developer according to claim 20 wherein the thermoplastic resin is a copolymer of ethylene (89%)/methacrylic acid (11%) having a melt index at 190° C. of 100.

23. An electrostatic liquid developer according to claim 1 wherein the thermoplastic resin component is a copolymer of acrylic or methacrylic acid and at least one alkyl ester of acrylic or methacrylic acid wherein alkyl is 1 to 20 carbon atoms.

24. An electrostatic liquid developer according to claim 23 wherein the thermoplastic resin component is a copolymer of methyl methacrylate(50-90%)/methacrylic acid (0-20%)/ethylhexyl acrylate(10-50%).

25. An electrostatic liquid developer according to claim 1 wherein the particles have an average by area particle size of less than 5 μm.

26. A process for preparing a positive-working electrostatic liquid developer for electrostatic imaging comprising
(A) dispersing at an elevated temperature in a vessel a thermoplastic resin, and a nonpolar liquid having a Kauri-butanol value of less than 30, while maintaining the temperature in the vessel at a temperature sufficient to plasticize and liquify the resin and below that at which the nonpolar liquid degrades and the resin decomposes,
(B) cooling the dispersion, either
  (1) without stirring to form a gel or solid mass, followed by shredding the gel or solid mass and grinding by means of particulate media with or without the presence of additional liquid;
  (2) with stirring to form a viscous mixture and grinding by means of particulate media with or without the presence of additional liquid; or
  (3) while grinding by means of particulate media to prevent the formation of a gel or solid mass with or without the presence of additional liquid;
(C) separating the dispersion of toner particles having an average by area particle size of less than 10 μm from the particulate media, and
(D) adding to the dispersion during or subsequent to Step (A) an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

27. A process according to claim 26 wherein the A block of the AB diblock copolymer is a polymer prepared from at least one monomer selected from the group consisting of (1) $CH_2=CCH_3CO_2X$, (2) $CH_2=CHCO_2X$, (3) $CH_2=COR-CO_2X$, and (4) $CH_2=CHR^1-CO_2X$ wherein R is alkyl of 1 to 200 carbon atoms, aryl of 6 to 30 carbon atoms, alkylaryl of 7 to 200 carbon atoms, $R^1$ is an aromatic ring wherein the ring carbon atoms not substituted by the vinyl group may be substituted with R, and X is a $Ca^{2+}$, $Ba^{2+}$, $Zr^{2+}$, $Fe^{3+}$, $Mn^{2+}$, $NR_4^+$, wherein R is alkyl of 1 to 200 carbon atoms, aryl of 6 to 30 carbon atoms, alkylaryl of 7 to 200 carbon atoms.

28. A process according to claim 26 wherein the B block of the AB diblock copolymer is a polymer prepared from at least one monomer selected from the group consisting of butadiene, isoprene and compounds of the general formulas: $CH_2=CCH_3CO_2R^2$ and $CH_2=CHCO_2R^2$ wherein $R^2$ is alkyl of 8 to 30 carbon atoms.

29. A process according to claim 26 wherein the AB diblock copolymer is selected from the group consisting of poly-(N,N-dimethyl-benzyl ammonium) methacrylate and polyethylhexyl methacrylate; poly-calcium methacrylate and polyethylhexyl methacrylate, poly-iron acrylate and polybutadiene, poly-barium-2-vinylbenzoic acid and polyisoprene, poly-manganese-4-vinylbenzoic acid and polylauryl methacrylate, and polymethyltriethylammonium methacrylate and polystearylmethacrylate.

30. A process according to claim 26 wherein there is present in the vessel up to 100% by weight of a polar liquid having a Kauri-butanol value of at least 30, the percentage based on the total weight of the developer liquid.

31. A process according to claim 26 wherein the particulate media are selected from the group consisting of stainless steel, carbon steel, ceramic, alumina, zirconia, silica and sillimanite.

32. A process according to claim 26 wherein the thermoplastic resin is a copolymer of ethylene and an $\alpha,\beta$-ethylenically unsaturated acid selected from the group consisting of acrylic acid and methacrylic acid.

33. A process according to claim 26 wherein the thermoplastic resin is a copolymer of ethylene (80 to 99.9%)/acrylic or methacrylic acid (20 to 0%)/alkyl ester of acrylic or methacrylic acid wherein alkyl is 1 to 5 carbon atoms (0 to 20%).

34. A process according to claim 33 wherein the thermoplastic resin is a copolymer of ethylene (89%)/methacrylic acid (11%) having a melt index at 190° C. of 100.

35. A process according to claim 26 wherein the thermoplastic resin component is a copolymer of acrylic or methacrylic acid and at least one alkyl ester of acrylic or methacrylic acid wherein alkyl is 1 to 20 carbon atoms.

36. A process according to claim 35 wherein the thermoplastic resin component is a copolymer of methyl methacrylate (50-90%)/methacrylic acid (0-20%)/ethylhexyl acrylate (10-50%).

37. A process according to claim 26 wherein additional nonpolar liquid, polar liquid, or combinations thereof is present to reduce the concentration of toner particles to between 0.1 to 15 percent by weight with respect to the developer liquid.

38. A process according to claim 37 wherein the concentration of toner particles is reduced by additional nonpolar liquid.

39. A process according to claim 26 wherein cooling the dispersion is accomplished while grinding by means of particulate media to prevent the formation of a gel or solid mass with or without the presence of additional liquid.

40. A process according to claim 26 wherein cooling the dispersion is accomplished without stirring to form a gel or solid mass, followed by shredding the gel or solid mass and grinding by means of particulate media with or without the presence of additional liquid.

41. A process according to claim 26 wherein cooling the dispersion is accomplished with stirring to form a viscous mixture and grinding by means of particulate media with or without the presence of additional liquid 42. A process according to claim 26 wherein an adjuvant compound selected from the group consisting of polyhydroxy compound, aminoalcohol, polybutylene succinimide, metallic soap, and an aromatic hydrocarbon is added during the dispersing step (A).

43. A process according to claim 42 wherein the adjuvant compound is an aminoalcohol.

44. A process according to claim 37 wherein an adjuvant compound selected from the group consisting of polyhydroxy compound, aminoalcohol, polybutylene succinimide, metallic soap, and an aromatic hydrocarbon is added.

45. A process according to claim 44 wherein the adjuvant compound is a polyhydroxy compound.

46. A process according to claim 44 wherein the adjuvant compound is a metallic soap dispersed in the thermoplastic resin.

47. A process according to claim 46 wherein the metallic soap adjuvant compound is aluminium stearate.

48. A process for preparing a positive-working electrostatic liquid developer comprising
(A) dispersing a thermoplastic resin and optionally a colorant and/or adjuvant in the absence of a nonpolar liquid having a Kauri-butanol value of less than 30 to form a solid mass.
(B) shredding the solid mass,
(C) grinding the shredded solid mass by means of particulate media in the presence of a liquid selected from the group consisting of a polar liquid having a Kauri-butanol value of at least 30, a nonpolar liquid having a Kauri-butanol value of less than 30, and combinations thereof,
(D) separating the dispersion of toner particles having an average by area particle size of less than 10 $\mu$m from the particulate media, and
(E) adding additional nonpolar liquid, polar liquid or combinations thereof to reduce the concentration of toner particles to between 0.1 to 15 percent by weight with respect to the liquid; and
(F) adding to the dispersion an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

49. A process for preparing a positive-working electrostatic liquid developer comprising (A) dispersing a thermoplastic resin and optionally a colorant and/or adjuvant in the absence of a dispersant nonpolar liquid having a Kauri-butanol value of less than 30 to form a solid mass.

(B) shredding the solid mass, (C) redispersing the shredded solid mass at an elevated temperature in a vessel in the presence of a nonpolar liquid having a Kauri-butanol value of less than 30, while maintaining the temperature in the vessel at a temperature sufficient to plasticize and liquify the resin and below that at which the nonpolar liquid degrades and the resin and/or colorant decomposes, (D) cooling the dispersion, either
  (1) without stirring to form a gel or solid mass, followed by shredding the gel or solid mass and grinding by means of particulate media with or without the presence of additional liquid;
  (2) with stirring to form a viscous mixture and grinding by means of particulate media with or without the presence of additional liquid; or
  (3) while grinding by means of particulate media to prevent the formation of a gel or solid mass with or without the presence of additional liquid;

(E) separating the dispersion of toner particles having an average by area particle size of less than 10 $\mu$m from the particulate media, and (F) adding additional nonpolar liquid, polar liquid or combinations thereof to reduce the concentration of toner particles to between 0.1 to 15 percent by weight with respect to the liquid; and (G) adding to the dispersion an AB diblock copolymer charge director substantially soluble in component (A), wherein the B block is a polymer substantially soluble in component (A) having a number average molecular weight range of 2,000 to 50,000, and the A block is a salt of a carboxylic acid-containing polymer having a number average molecular weight range of 200 to 10,000, the weight percent of the A block being 5 to 40% of the polymer.

* * * * *